July 31, 1962     I. B. THIERMAN     3,046,796

GYROSCOPE CAGING MEANS

Filed July 25, 1960     2 Sheets-Sheet 1

INVENTOR
Irwin B. Thierman

BY

AGENT

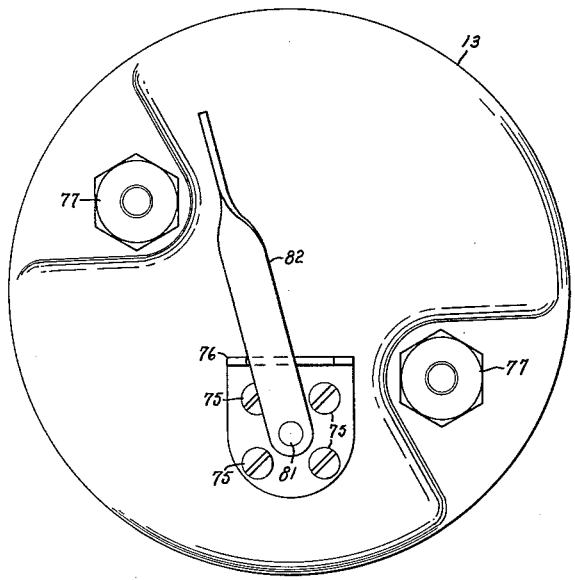
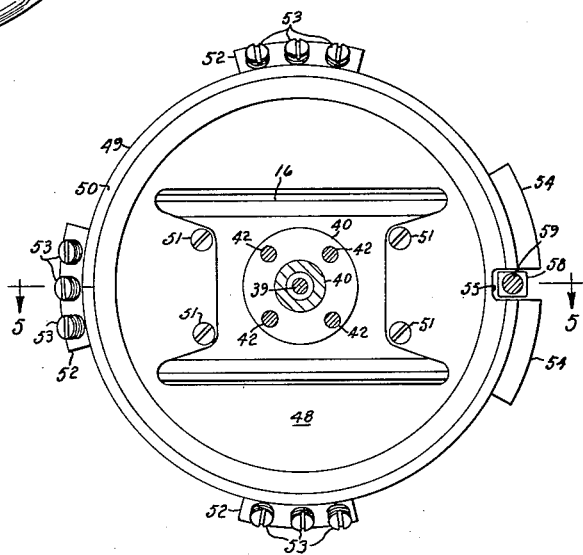
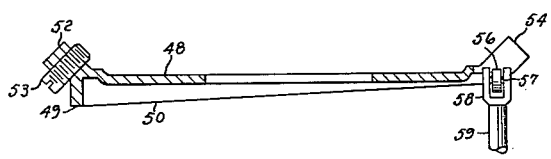

United States Patent Office 3,046,796
Patented July 31, 1962

3,046,796
GYROSCOPE CAGING MEANS
Irwin B. Thierman, Portland, Oreg., assignor to Iron Fireman Manufacturing Company, a corporation of Oregon
Filed July 25, 1960, Ser. No. 44,970
9 Claims. (Cl. 74—5.1)

This invention relates generally to a gyroscope and more particularly to means for rapidly and simultaneously caging both the gimbal rings thereof to be followed by the precisely simultaneous release of both rings from caging restraint.

For disclosure of utility the gyroscope to which the present caging means is applied will be assumed to include a case or inner gimbal ring with a wheel, spin motor, and air erection system like that shown in U.S. Pat. No. 2,772,570 assigned to the assignee of this present invention.

It is well known that a gravity vertical gyroscope like the continuously air erected one of Pat. No. 2,772,570 equipped with reference potentiometers or synchros can be used to cause a fluid supported vehicle to travel a selected three dimensional direction vs time path in the fluid if the directional control mechanism of the propulsion means for the vehicle is made responsive to the angular relations of the gyro gimbal rings to the gyro frame or platform to which the gyro frame is attached. For instance to fire an unattended self propelled airborne missile with a control platform to which the gravity vertical continuously erected gyroscope frame is attached, it must first be properly oriented with its flight control system and the gimbal ring potentiometers of the gyro, then the spin motor of the gyroscope must be activated to erect the spin axis thereof and the missile propulsion means must be ready to go. But at the last instant before the missile is sent on its way the gyroscope must be caged and released, and the time reqired therefor must be a minimum to lessen the gyro drift time of flight path error, and the release of the two gimbal rings must be as simultaneous as possible to lessen the precession error of one gimbal caused by the delayed release of the other.

The present invention does not include either any of the mechanisms associated with the gyroscope in the suggested use thereof nor in the continuous erection thereof.

The primary object of this invention is to provide a gyroscope with a simple trouble free means for rapidly and simultaneously caging both its gimbal rings and instantaneously simultaneously releasing both said gimbal rings for free rotation in either direction about their respective axes in response to the relative movement in space of the frame of the gyroscope with respect to its spin axis.

A second object of this invention is to provide a gyroscope with such a caging means resiliently biased toward its uncaged position and operable from the exterior of the frame of said gyroscope to overcome said resilient biasing means to cage the gyroscope.

A third object is to provide such a gyroscope with manually operable resilient lever means for uncaging the gyroscope by releasing the lever after the gyroscope has been caged by moving the lever to overcome the resilient caging means.

How these and other objects are attained is made clear in the following description referring to the attached drawing in which FIG. 1 is a side elevation view in fragmental partial section along the plane of the spin Axis, S, and the outer gimbal ring has $R^1$, of a gyroscope caged by the caging means of this invention.

FIG. 2 is an end vertical elevation view of the gyroscope of FIG. 1 as viewed from the line 2—2 of FIG. 1.

FIG. 4 is a transverse sectional elevation of the gyroscope of FIG. 1 as viewed along the line 4—4 of FIG. 1 to show the outer gimbal caging cam and cam follower of this invention.

FIG. 5 is a transverse fragmental view in partial section of the outer gimbal cam and cam follower of this invention as viewed along the line 5—5 of FIG. 4.

Like reference numerals refer to like parts in the several figures of the drawing.

Figure 1:
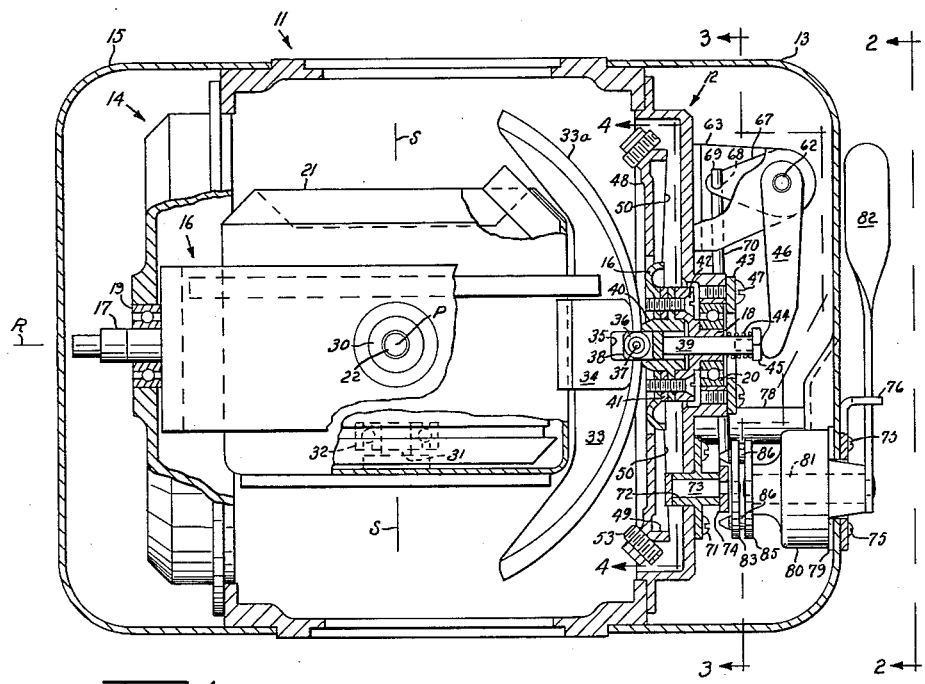

Referring now to the drawing it is noted that in the figures, where parts are movable they are shown in the caged and erected positions of the gyroscope.

As shown best in FIG. 1 the gyroscope to which the present caging means is applied includes a stationary base 11 with a caging end bell 12 covered by a front cover 13 and a rear end bell 14 covered by a rear cover 15.

Outer gimbal ring 16 by its journals 17, 18 aligned with axis R is seen to be supported respectively by outer gimbal ring bearings 19, 20, in rear end bell 14 and caging end bell 12 of frame or base 11.

The wheel case or inner gimbal ring 21 is seen to be supported on its axis P, perpendicular to axis R, by its journals, 22, one shown, on opposite sides of outer gimbal ring 16 by inner gimbal ring bearings 30, one shown. In the caged or erected position of the gyroscope the spin motor, wheel and fan axle 31 is supported on upper and lower wheel bearings 32, one shown, in wheel case 21 on axis S perpendicular to axes R and P.

The parts interior to case 21, being no part of this invention, will not be further described although the substantially equivalent parts will be seen in U.S. Pat No. 2,772,570.

Edge type inner gimbal ring caging cam 33 is seen to be secured to case 21 by bracket 34 welded both to cam 33 and case 21. The center plane of the cam edge of cam 33 includes both the spin axis S and the outer gimbal ring axis R while the center of cam slot 35 normal to the edge of cam 33 is in the plane including the R and P axes.

Inner gimbal ball bearing cam follower 36 is rotatably secured on bearing pin 37 at the bifurcated end 38 of follower pin 39 slidably supported along axis R by inner ring cam follower guide 40 and outer ring journal 18. Journal 18, guide 40, and spacer 41 are secured to outer gimbal ring 16 to rotate therewith by screws 42. Outer gimbal ring bearing 20 is supported as shown within the central bearing hole in caging end bell 12 of base 11 and is confined therein by retainer 43 and screws 47 rotatably to support outer gimbal ring 16.

Note that compression spring 44 confined between journal 18 of outer gimbal ring 16 and head 45 of cam follower pin 39 biases pin 39 with follower roller 36 away from inner gimbal cam 33 and out of slot 35 into which roller 36 is held in accordance with the position of caging arm 46.

In FIGURES 1, 4 and 5 outer gimbal ring cam 48 is seen to be formed with a short cylindrical barrel 49 having an edge cam face 50 formed in a plane at a slight angle to the P and R axes but parallel to the S axis when the gyro is caged. Outer gimbal ring cam 48 is secured to outer gimbal ring 16 by screws 51 as seen in FIG. 4. Wings 52 extending outwardly from cam 48 support balancing screws 53 as required by unbalancing weights like 54.

Substantially the same as above described for the inner gimbal ring caging cam follower means, it should now be noted that parallel in the plane of the R and P axes but to one side of the slot 35 in the inner gimbal ring cam is a similar slot 55 in the outer gimbal ring cam (see FIG. 4) into which an outer gimbal ring ball bearing cam follower 56 will drop and lock cam 48 in its caged position shown in FIGS. 4 and 5 when the pressure of roller 56 on cam 50 causes the outer gimbal ring with cam 50 to rotate to its caged position shown in FIGS. 4 and 5. Follower bearing 56 is rotatably secured by bearing pin 57 in the bifurcated end 58 of follower pin 59 slidably supported for movement parallel to the R axis by outer gimbal ring caging pin guide, not shown, with its end supported in guide cap 60 secured to base end bell 12 by screws 61, see FIG. 3.

As is shown in FIG. 1 for inner gimbal ring caging pin 39, so for outer gimbal ring caging pin 59, a compression spring like 44 but not shown, confined between guide cap 60 and the head 59a of pin 59 biases pin 59 with cam follower roller 56 away from outer gimbal ring cam edge 50 and out of slot 55 into which roller 56 is held in accordance with the position of the caging arm 46a secured symmetrically with arm 46 on opposite ends of caging pivot arm shaft 62 journalled at opposite ends in pivot frame 63 secured to base end bell 12 by screws 64.

As is well known, with gimbal ring caging cams of the present type, pressure of a cam follower on the cam face edge of its respective cam causes the cam to rotate as an inclined plane under the follower in the direction to move the cam caging slot under the follower so that in the present case if torque is exerted on caging pivot arm shaft 62 to rotate caging arms 46 and 46a in the direction to press cam follower bearings 36 and 56 on the respective cam faces of cams 33 and 48, first one cam follower will strike the face of its cam and continue onward causing its cam to rotate until the second cam follower strikes the face of its cam and thereafter the cams will be rotated together until at the same time both cam followers 36 and 56 drop into the respective notches 35 and 55 of the respective cams 33 and 48. Then if the caging arm shaft is released the compression spring biasing forces on pins 39 and 59 will be effective to spring rollers 36 and 56 from notches 35 and 55 so rapidly that due to the inertia of the gimbal rings and cams neither of the gimbal rings will have moved before both followers will be free of their respective caging slots.

This type of operation is accomplished in the presently disclosed gyroscope as follows.

Set screw 65 secures linking arm collar 66 to shaft 62. Linking arm 67 is welded to collar 66. At the free end of linking arm 67 a small hole 68 therein is interlinked with a laterally extending hook 69 formed on the upper end of push rod 70.

Secured by screws 71 to and through caging end bell 12 is universal joint caging bushing 72 into which headed universal joint bearing 73 is inserted with the reduced end of bearing 73 extending through universal joint caging arm 74 to which bearing 73 is secured by welding. Caging arm 74 is thus secured in end bell 12 longitudinally of bearing 73 and rotatably with bearing 73.

Secured by screws 75 to front cover 13 of end bell 12 of base 11 is caging handle throw limit bracket 76. Front cover 13 is firmly secured to base 11 by cover attachment screws 77, shown only in FIG. 2, screwed tightly into internal threaded bosses 78 extending outwardly from end bell 12 to support cover 13.

Figure 3:
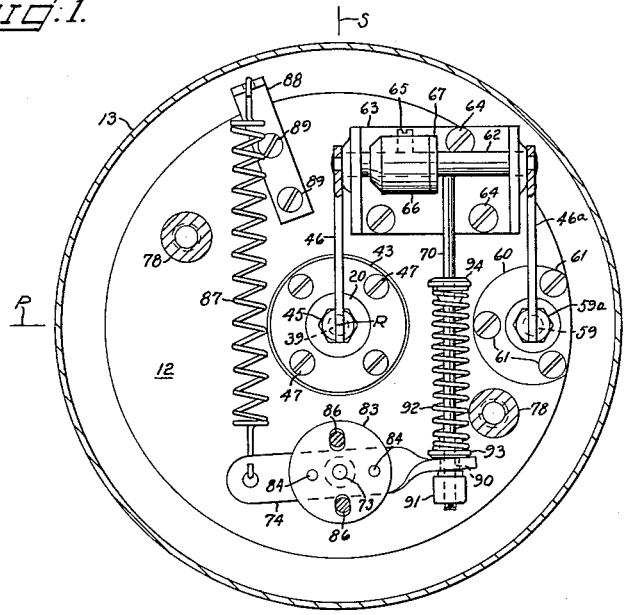
FIG. 3 is a transverse sectional elevation of the gyroscope of FIG. 1 as viewed along the line 3—3 of FIG. 1.

Screws 75 pass through handle throw limiting bracket 76, cover 13, stiffening washer 79 and bushing 80 of shaft 81 of caging handle 82 secured to shaft 81 to rotate therewith in bushing 80 within the limits allowed by bracket 76. For shaft 81, rotatable in removable cover 13, to move with it shaft 73, rotatable in end bell 12, the shafts are aligned and connected by aligned engagement pins easily disengaged automatically when cover 13 is moved endways away from end bell 12. This shaft connecting means, somewhat in the nature of a universal joint, is formed of a disk 83 piloted on shaft 73 and secured to caging arm 74 by welding at 84 as seen in FIGS. 1 and 3. Also a disk 85 is secured to caging lever shaft 81 and has longitudinally pointed radially spaced driving pins 86 secured therein as shown in FIG. 1 to engage radially slightly oversize holes formed through disk 83 to receive pins 86. Thus when caging lever 82 is moved sidewise from an approximately vertical position caging arm 74 will be moved in the same rotary direction from an approximately horizontal position under the control of lever 82 and limited by bracket 76.

Remembering that push rod 70 linked at its upper end with arm 67 must be pushed upwardly to rotate shaft 62 to cause caging arms 46 and 46a to push follower pins 39 and 59 with cam followers 36 and 56 against cam edges 33a and 50 to rotate cams 33 and 48 to permit followers 36 and 56 to drop into cam slots 35 and 55, then to maintain the gyro free of the restrain of the caging means, universal joint caging arm 74 is biased in its caging release direction by caging release tension spring 87 strained between bracket 88 secured to end bell 12 by screws 89 and the free end of caging arm 74, the other end of which is formed with a hole 90 through which the threaded end of push rod 70 is received and positioned longitudinally therethrough by adjusting screw 91.

To prevent damaging rigidity of the operating parts in the caging operation, the caging force manually applied to caging handle 82 is resiliently applied to push rod 70 by tension caging spring 92 strained between spring terminal spools 93 and 94. Spool 94 is secured in position along push rod 70 by welding while spool 93 is slidably guided along push rod 70 and rockably supported on arm 74.

Again it is noted that in the drawing the gyroscope is shown to be held in the caged position thereof by the presently disclosed, illustrated and described, means for simultaneously caging both gimbal rings thereof. Then simultaneously to uncage both gimbal rings it is only necessary to release the external caging handle 82 to allow release spring 87 to rotate arm 74 in the clockwise direction as shown in FIG. 3, taking push rod 70 with it, in the downward direction to rotate shaft 62 to pull the ends of arms 46, 46a away from the heads 45, 59 of cam follower pins 39, 59. Thus removing all caging pressure of arms 46, 46a from heads 45, 59a of cam follow pins 39 and 59 allows springs like 44 to retract pins 39, 59 with their respective rollers 36 and 56 from their respective cam slots 35 and 55. And, as arm 74 is rotated in the clockwise direction on its shaft 73, disk 83 on shaft 73 takes with it pins 86 of disk 85 on shaft 81 and thereby moves caging lever 82 clockwise with shaft 81, until lever 82 is stopped in its right hand or uncaged limit position by bracket 76 on front cover 13 of end bell 12 of frame 11.

Having recited some of the objects of this invention, illustrated and described one form in which the invention may be practiced and explained its operation, I claim:

1. A gyroscope having a stationary base, an outer gimbal ring supported on said base for rotary motion in either direction about an outer gimbal ring axis, an inner gimbal ring supported on said outer ring for rotary motion in either direction about an inner axis perpendicular to said outer ring axis, a gyroscope wheel supported on said inner gimbal ring for rotary motion in a selected direction about a spin axis perpendicular to said inner ring axis, each one of said three axes always intersecting each other of said three axes at a common point, said outer gimbal ring being said to be caged when said outer ring is rotated about said outer ring axis to a selected angular position of said outer ring with respect to said base, said inner gimbal ring being said to be caged when said inner ring is rotated about said inner ring axis to a position of perpendicularity of said outer ring axis and said spin axis, together with caging means for said gyroscope including a first caging means operable to move said outer gimbal ring to its caged position, a second caging means operable to move said inner gimbal ring to its caged position and a third caging means for operating at one time both said first and second caging means simultaneously to finish caging both said outer gimbal ring and said inner gimbal ring.

2. The gyroscope of claim 1 in which said first caging means includes a first two lobed cylindrical cam secured on said outer gimbal ring to move concentrically therewith, the edge face of said cylindrical cam being in a plane at complementary angles to said inner and outer gimbal axes, said second caging means including a second two lobed edge face cam secured to said inner gimbal ring in a plane including said outer gimbal axis and perpendicular to said inner gimbal ring axis, the low points between the lobes of each of said cams being in a caging plane including both said inner and outer gimbal axes, said second caging means including a second cam follower supported in said base for movement therein axially of said outer ring axis, said first caging means including a first cam follower supported in said base parallel with said second cam follower and spaced therefrom the radius of said cylindrical cam, both of said cam followers being in said caging plane when said caging plane is horizontal and each of said cam followers including respective resilient means biasing said followers away from their respective cams.

3. The gyroscope of claim 2 including a caging axle rotatably secured to said base on the outside thereof, said axle being perpendicular to said followers in a plane spaced parallel to the plane of said followers and a pair of caging levers each secured at one end to said caging axle in a respective plane of its follower to contact its respective follower to overcome its resilient means to press its said follower against its respective cam to cage its respective gimbal ring when said axle is rotated in one direction and to permit its respective resilient means to uncage its respective gimbal ring when said axle is released for rotation in the other direction.

4. The gyroscope of claim 3 including a caging arm rotatably secured on said base, a linking arm secured to said caging axle to rotate therewith a thrust link linked secured at one end with said linking arm and at the other end linked by a resilient thrust link to said caging arm whereby on movement of said caging arm in one direction said caging arm will press on said resilient thrust link yieldingly to press on said linking arm to rotate said axle with both said caging levers to cage both said gimbal rings.

5. The gyroscope of claim 4 including tension spring means secured at one end to said base and at the other end to said caging arm to bias said caging arm in the direction of rotation to move said caging axle in the direction to move said followers away from said cams to uncage said gyroscope.

6. The gyroscope of claim 5 including a cover therefor, a bearing mounted on said cover and therethrough, a shaft rotatably secured in said bearing, one end of said shaft being removably secured to said caging arm within said cover, a caging handle secured to said shaft to rotate therewith outside said cover, and caging and uncaging throw limit means for said handle secured to the outside of said cover.

7. A three axis two gimbal ring gyroscope having a base, caging cams for each of said gimbal rings within said base, a pair of parallel cam followers longitudinally slidably secured through said base one each for said cams, resilient means for each of said followers biasing said followers away from said cams, together with lever, linkage and axle means operatively secured to said base on the outside thereof for overcoming the resistance of said resilient means to push said followers against said cams to cage the gimbal rings of said gyroscope rapidly and simultaneously and then when desired to rapidly and simultaneously uncage both said gimbal rings of said gyroscope.

8. A three axis gyroscope having a base, two gimbal rings with normally perpendicular axes each of which must be rotated about its respective axis into perpendicularity with a third axis by a respective cam and cam follower for each of said rings, said rings being within said base each with its respective cam secured thereto to rotate therewith, said cam followers extending parallel spaced one from the other through said base from the outside to the inside thereof, one of said followers being alined with the axis of one of said rings, resilient means biasing each of said followers away from its respective cam and manual means operatively carried on said base outside thereof for rapidly and simultaneously caging both said rings and thereafter releasing both said followers from outside said base rapidly and simultaneously to uncage said gyroscope.

9. A gyroscope caging means comprising a first cam for use in caging a first gimbal ring of said gyroscope, a second cam for use in caging a second gimbal ring of said gyroscope, a first cam follower for caging said first ring, a second cam follower for caging said second ring, a first uncaging spring for moving said first cam follower to its uncaged position, a second uncaging spring for moving said second cam follower to its uncaged position, a first lever for moving said first cam follower against the bias of said first uncaging spring to cage said first ring, a second lever for moving said second cam follower against the bias of said second uncaging spring to cage said second ring, a third lever resiliently biased in one direction of rotation and manually operable in the other direction of rotation to overcome its said one directional bias and resiliently engage said first and second levers to cage both said gimbal rings whereby when said third lever has been rotated manually in said other direction to cage both said gimbal rings and released its first direction biasing means will retract said third lever to free both said gimbal rings simultaneously to their uncaged conditions.

References Cited in the file of this patent

UNITED STATES PATENTS

| | | |
|---|---|---|
| 1,982,637 | Carlson | Dec. 4, 1934 |
| 2,716,344 | Seifried | Aug. 30, 1955 |
| 2,729,978 | Judson | Jan. 10, 1956 |
| 2,842,967 | Borden et al. | July 15, 1958 |

FOREIGN PATENTS

| | | |
|---|---|---|
| 562,688 | Great Britain | July 12, 1944 |